No. 627,086. Patented June 20, 1899.
A. R. ANDERSON.
BICYCLE PROPULSION.
(Application filed Sept. 22, 1897.)
(No Model.)
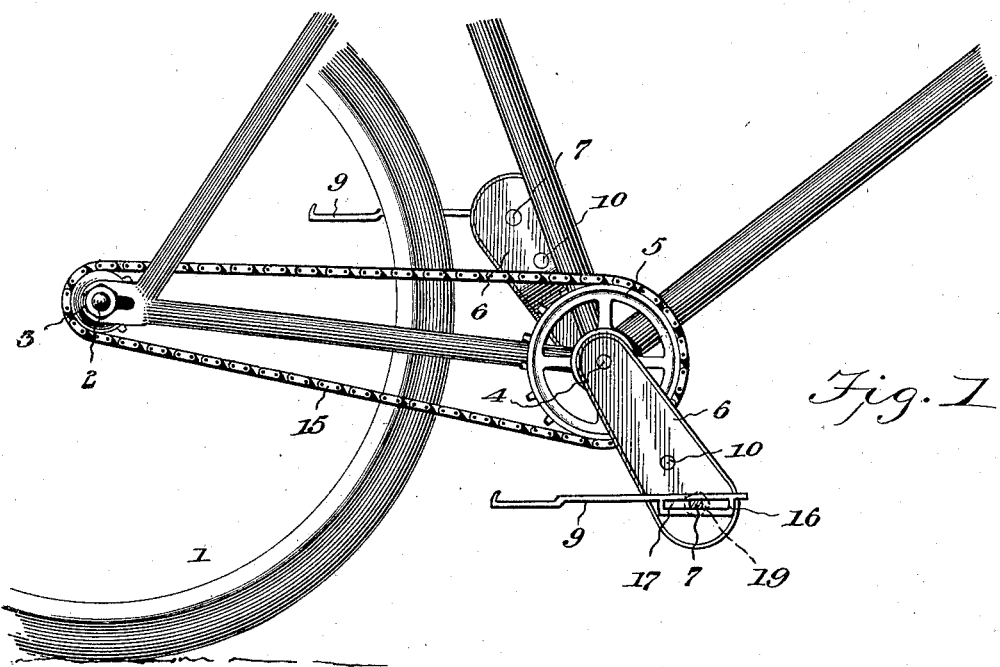
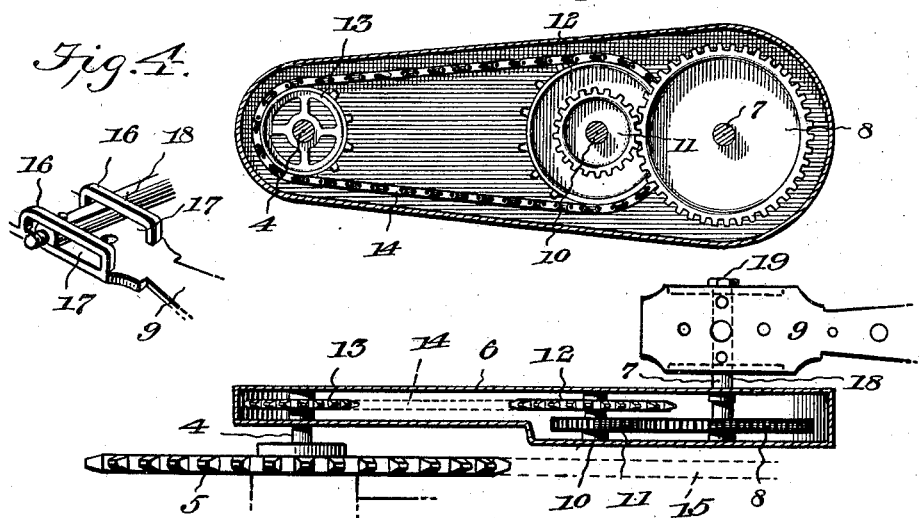
Witnesses
E. N. Monroe
V. B. Hillyard.
Inventor
Aug. R. Anderson,
By his Attorneys,
C. A. Snow & Co.

UNITED STATES PATENT OFFICE.

AUGUST REINHOLD ANDERSON, OF CAMERON, IDAHO, ASSIGNOR OF ONE-HALF TO NICHOLAS H. CARTER, OF HOWARD, IDAHO.

BICYCLE PROPULSION.

SPECIFICATION forming part of Letters Patent No. 627,086, dated June 20, 1899.

Application filed September 22, 1897. Serial No. 652,598. (No model.)

*To all whom it may concern:*

Be it known that I, AUGUST REINHOLD ANDERSON, a citizen of the United States, residing at Cameron, in the county of Nez Perces and State of Idaho, have invented a new and useful Bicycle Propulsion, of which the following is a specification.

My invention relates to bicycle propulsion or speed-multiplying gearing for bicycles and similar vehicles, and has for its object to simplify and improve the construction of means for multiplying the speed of rotation of the driven spindle, such as a crank or wheel shaft, with relation to that of a crank-arm or of a crank-pin carried by said arm; and the particular object of my invention is to provide a gearing of this class which is especially adapted for use in connection with bicycles and similar vehicles, the improvement consisting of a crank-arm, pedal, and attachments, of which the former may be attached to the crank-shaft of a vehicle of the bicycle type without otherwise modifying the construction of the vehicle.

A further object of my invention is to provide in connection with the improved crank-arm and speed-multiplying gearing a pedal, which may be adjusted to suit the length of the foot of the rider in order to secure the best results and which at the same time provides a heel as well as a toe rest for the foot, or practically a foot-bearing which is approximately coextensive with the foot.

Further objects and advantages of this invention will appear in the following description, and the novel features thereof will be particularly pointed out in the appended claims.

In the drawings, Figure 1 is a side view of a vehicle crank-arm constructed in accordance with my invention applied in the operative position to a bicycle. Fig. 2 is a longitudinal vertical section of the crank-arm, showing the gearing in elevation. Fig. 3 is a horizontal sectional view of the same, showing the gearing in elevation, the chains being indicated in dotted lines. Fig. 4 is a detail view in perspective of a portion of the pedal to show the construction of the means whereby it is adjustably mounted upon the crank-pin.

Similar numerals of reference indicate corresponding parts in all the figures of the drawings.

In order that the features of construction constituting my invention may be fully understood, I have illustrated the same as applied to a bicycle, of which 1 designates the driving-wheel, having an axle 2, mounted in a frame, as in the ordinary practice, said wheel being provided with the usual rear sprocket 3, connected by a chain 15 with the front or driving sprocket 5, which may be of any desired diameter with relation to the rear or driven sprocket and is fixed to the crank-shaft 4, suitably mounted in the crank-hanger of the frame.

The crank-arm 6, constituting the essential feature of my invention, is loosely mounted upon the crank-shaft 4 and is provided at its outer end with a loose revoluble crank-pin 7, which so far as its general features of construction and manner of mounting in the crank-arm are concerned may be varied as found desirable in practice. In the construction illustrated the crank-pin proper is shown mounted for rotation in suitable bearings in the crank-arm, as in order to house the elements of the gearing I find it desirable to employ a crank-arm of hollow construction, and hence I am enabled to provide the crank-pin with a plurality of spaced bearings in the crank-arm, which effectually provides against twisting or displacing the crank-pin.

Fixed to the crank-shaft, preferably within the casing formed by the hollow crank-arm, is a driven sprocket 13, connected by a chain 14 with a driving-sprocket 12, of which the spindle 10 is also mounted in spaced bearings formed in opposite side walls of the hollow crank-arm. This spindle 10 also carries in fixed relation thereto a driven pinion 11, with which meshes a driving-gear 8, which is fixed to the crank-pin between the points of bearing of the latter. Obviously when the crank-arm is moved around the crank-shaft as a center, as in the ordinary operation of propelling a cranked bicycle, while the crank-pin is held from rotation, the driving-gear 8 will communicate rotary motion at a multiplied rate of speed to the driven gear 11, which in turn will actuate the driving-sprocket 12, and the latter will communicate motion from the chain 14 to the sprocket-pinion, whereby the crank-shaft is turned at a speed in excess of the crank-arm and also at a speed in excess of the relative backward rotation of the crank-pin.

The gears 8 and 11 constitute reversing devices for converting the backward movement of the crank-pin with relation to the crank-arm into a forward movement of the spindle 10, or, in other words, to a movement in the same direction as the crank-arm, and this conversion of backward into forward motion is preferably accomplished by intermeshing gears located at the outer end of the crank-arm in order to reduce friction, as it is obvious that in a multiplying-gear the speed of rotation of the elements near the point of application of power is less than those near the point of use, or, as in the present instance, the friction between intermeshing gears located contiguous to the crank-pin is less than it would be if the reversal of motion was accomplished at or near the crank-shaft. Also by arranging the direction-reversing gears 8 and 11 near the outer or free end of the crank-arm, or near the crank-pin end thereof, I am enabled to construct a crank-arm which, while serving to house the speed-multiplying gearing, does not constitute a clumsy feature of the vehicle, and in addition to this the weight of the direction-reversing gears near the free end of the crank-arm serves as a means of overcoming temporary resistance and in insuring a more uniform speed of rotation of the crank-shaft. In other words, the terminally-weighted crank-arms perform the functions of balance or fly wheels, which materially assist in preserving a uniformity of speed in opposition to periodic or occasional variations of resistance. Also in order to accommodate the plurality of large gears 8 and 12, located near the outer or free end of the crank-arm, the gear 13, which is secured to the crank-shaft, being of comparatively small diameter, the crank-arm is enlarged toward its outer end to form, preferably, an inwardly-tapered housing, (shown clearly in Figs. 2 and 3,) whereby the weight of the large gears at the outer end of the arm is supplemented by the weighted outer or free end of the arm proper. This construction assists materially in increasing the momentum of the crank-arms when the machine is in motion.

The means which I have devised for insuring the maintenance of the crank-pin against rotary motion with the crank-arm and enable the operator to impart thereto a backward rotation with relation to the crank-arm during its orbital movement consists of a pedal 9, fitted upon the projecting portion of the crank-pin, but extended rearwardly to form, in addition to the usual toe-rest, a heel-rest, whereby the resistance which must be offered by the foot of the rider to the forward turning of the crank-pin need not be sustained by the ankle. Inasmuch, however, as it is necessary in order to obtain the maximum efficiency in the application of pressure to the crank-pin to dispose the toe of the foot over the crank-pin or over the point of application of pressure and as the lengths of feet vary, I have adopted a pedal having an adjustable connection with the crank-pin, whereby the distance of the heel-rest of the pedal from the transverse vertical plane of the crank-pin may be varied to suit the length of the rider's foot and enable the foot to be arranged with relation to the crank-pin so as to secure the maximum control. The means illustrated in the drawings for securing this longitudinal adjustment of the pedal with relation to the crank-pin include depending flanges 16 at the front end of the pedal and respectively contiguous to the side edges thereof, said flanges having longitudinal slots 17 for the reception of the flattened outer portion of the crank-pin, said flattened outer portion terminating at its inner end in shoulders 18, against which the inner flange 16 is held by means of a locking device, such as a nut 19, engaged with the outer end of the pin. By loosening this nut 19 the pedal may be adjusted longitudinally to enable the rider to obtain the desired pressure upon the crank-pin, whereupon the tightening of the nut will secure the pedal to the crank-pin against longitudinal displacement, and at the same time the opposite flattened portions of the crank-pin will prevent the turning thereof independently of the pedal.

From the above description it will be seen that in addition to the compactness of the multiplying-gear which I have disclosed I arrange the spur-gearing which constitutes the direction-reversing mechanism contiguous to the point of application of power, whereby such gearing is subjected to the least strain in use. I utilize the direction-reversing gearing, consisting of the driving-gear 8 and the driven gear 11, to accomplish the first step in the multiplication of speed; but owing to the fact that the mechanism must be compact and of the minimum weight I arrange these gears, as illustrated, adjacent to the outer or free end of the crank-arm, the driving-gear being attached to the crank-pin, whereby said gears are located at the point of least speed, and hence of least strain in the mechanism, to increase the durability of the gearing by avoiding the risk of stripping the teeth when the driving mechanism is subjected to a severe driving or restraining pressure. Furthermore, I have utilized the direction-reversing gearing as a means of weighting the outer or free ends of the crank-arms, and owing to the diametrically opposite disposition of the cranks employed upon a bicycle it is obvious that the weight of one crank-arm will counterbalance that of the other, and thus avoid the inconvenience which might otherwise result from the additional weight of crank-arms due to the gearing.

In addition to the above advantages of the construction disclosed it will be seen that I have provided a pedal having a heel-rest and constructed for longitudinal adjustment with relation to the crank-pin in order to enable the rider to obtain a foot-bearing, whereby the maximum efficiency in the application of power may be attained.

It will be understood that the adjustment of the pedal has with relation to the pedal-pin and therefore that by such adjustment the position of the front end of the pedal with relation to the crank-pin may be varied. This provides for securing the desired relation between the front and rear leverage of the pedal and adapts the structure to the preference of the rider.

Various changes in the form, proportion, and the minor details of construction may be resorted to without departing from the spirit or sacrificing any of the advantages of this invention.

Having described my invention, what I claim is—

1. The combination with a crank-axle, of a hollow crank-arm mounted upon the axle for independent rotary movement, a crank-pin mounted upon the crank-arm near its outer or free end for independent rotary movement, speed-multiplying and direction-reversing gearing consisting of a large driving-gear fixed to the crank-pin, a small driven gear meshing with the driving-gear and having its spindle arranged parallel with that of the driving-gear and arranged adjacent to the outer or free end of the crank-arm, sprocket-gears carried respectively by the crank-shaft and said driven gear, and a chain traversing said sprocket-gears, and a pedal attached to the crank-pin and held from independent rotation with relation thereto, substantially as specified.

2. The combination with a crank-axle, of a hollow crank-arm, mounted upon the axle for independent rotary movement and enlarged toward its outer end to weight it at that point, a crank-pin mounted upon the crank-arm at its enlarged end for independent rotary movement, speed-multiplying gearing including large gears located within the crank-arm at its outer or crank-pin end, and a smaller gear fixed to the crank-shaft and connected with said gearing to receive motion from the gears near the outer end of the arm, said gears being arranged to reverse the direction of rotation of the crank-shaft with relation to the crank-pin, all being arranged as described, whereby the crank-arm with its housed gearing produces a balance-wheel effect with relation to the crank-shaft, and a pedal attached to the crank-pin and held from independent rotation with relation thereto, substantially as specified.

3. The combination with a crank-shaft, of a crank-arm mounted upon the crank-shaft for rotation independently thereof, a crank-pin mounted upon the crank-arm for rotation independently thereof, speed-multiplying gearing connecting the crank-pin with the crank-shaft, and a pedal mounted at an intermediate point upon the crank-pin for bodily adjustment with relation to the same, to provide for simultaneously varying the positions of its front and rear ends with relation to the vertical plane of the crank-pin, said pedal being engaged with the crank-pin to hold the latter against rotation independently of the pedal, and means for securing the pedal at the desired adjustment, substantially as specified.

4. The combination with a crank-shaft, of a crank-arm mounted upon the crank-shaft for rotation independently thereof, a crank-pin mounted upon the crank-arm for rotation independently thereof, speed-multiplying gearing connecting the crank-pin with the crank-shaft, and a pedal having toe and heel rests and provided at its front end with longitudinal slots for engaging a flattened portion of the crank-pin, to provide for longitudinal adjustment of the pedal with relation to the crank-pin, and means for securing the pedal at the desired adjustment, substantially as specified.

5. In combination, a crank-shaft, a crank-arm mounted to turn loosely upon the crank-shaft, a crank-pin journaled loosely in the outer end of the crank-arm and having flattened sides and an inner shoulder, gearing connecting the crank-pin with the crank-shaft, a pedal having side flanges longitudinally slotted to receive the outer portion of the crank-pin and make adjustable connection therewith, and a binding-nut for clamping the pedal on the crank-pin at an adjusted position, substantially as specified.

In testimony that I claim the foregoing as my own I have hereto affixed my signature in the presence of two witnesses.

AUGUST REINHOLD ANDERSON.

Witnesses:
FRED BREYMAN,
A. D. KELLER.